No. 644,086. Patented Feb. 27, 1900.
W. L. MARTIN.
VEHICLE WHEEL AND BEARING.
(Application filed Nov. 23, 1899.)
(No Model.)
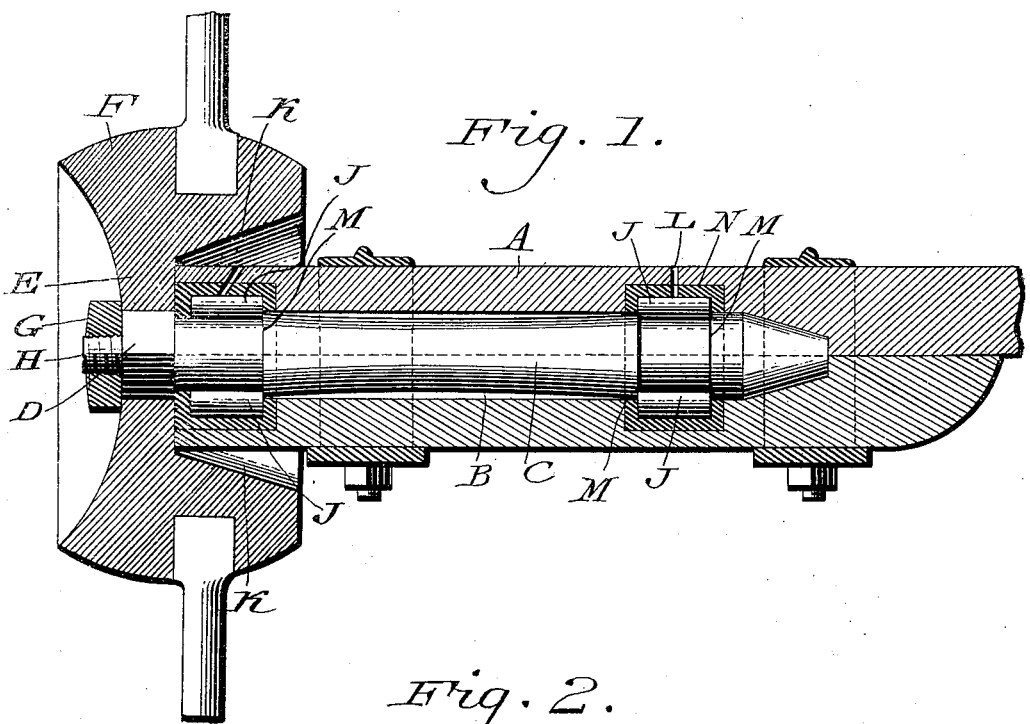
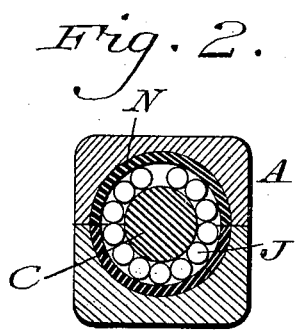
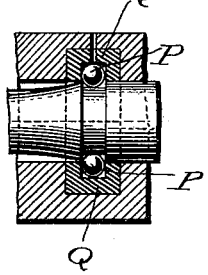
Witnesses
Inventor
William L. Martin
Attorney

UNITED STATES PATENT OFFICE.

WILLIAM L. MARTIN, OF RANCOCAS, NEW JERSEY.

VEHICLE-WHEEL AND BEARING.

SPECIFICATION forming part of Letters Patent No. 644,086, dated February 27, 1900.

Application filed November 23, 1899. Serial No. 738,014. (No model.)

*To all whom it may concern:*

Be it known that I, WILLIAM L. MARTIN, a citizen of the United States, residing at Rancocas, in the county of Burlington, State of New Jersey, have invented a new and useful Improvement in Vehicle-Wheels and Bearings, which improvement is fully set forth in the following specification and accompanying drawings.

My invention consists of improvements in vehicle-wheels and bearings therefor, the novel features of the same being hereinafter set forth, and pointed out in the claims that follow this specification.

Figure 1 represents a longitudinal section of a wheel and bearing embodying my invention. Fig. 2 represents a transverse section thereof on line $xx$, Fig. 1. Fig. 3 represents a section of a portion of a modification.

Similar letters of reference indicate corresponding parts in the figures.

Referring to the drawings, A designates an axletree or bearing, which is hollow, as at B, and receives the spindle or journal C, the forward portion D of which is squared or angular and fitted in a correspondingly-shaped opening in the hub E of the wheel F, whereby said wheel rotates as one with said spindle, and the wheel is boxless. In order to retain the wheel on the squared portion D, I employ a nut G, which is fitted on the threaded stem H on the outer end of said squared portion D. On the inner surface of the axletree are mounted the rollers J, which contact with and revolve on the adjacent portions of the spindle C. The inner side of the hub E has a recess K, which receives the forward portion of the axletree A, whereby the weight is directly over the adjacent portion of the axletree, as the journal-bearing, so that the far end of the spindle will not tilt when the vehicle is on level ground, it being also seen that owing to the rollers J the spindle C rotates with reduced friction and consequently more easily in the axletree as its bearing. The base-wall of the recess K, the same being vertical, abuts freely against the vertical end of the axletree A and also against the vertical face of the outer flange of the adjacent casing M, thus laterally sustaining the hub and causing it to rotate true and steady, the outer end of said axletree, as is evident, entering said recess to said base-wall and being circumscribed by the portion of the hub occupied by the spokes, so that the weight is superimposed directly around said outer end of the axletree, thus preventing tilting of the spindle, as has been stated, and wrenching off of the wheel. The recess K is conical or flaring, its base-wall being the narrowest, the same being at the forward end of said recess, so that when oil or grease escapes at the forward end of the axletree it will run down said recess and so escape at the widest end of the recess, which end is on the inner side of the hub, whereby the recess is prevented from clogging. Should dust, sand, &c., enter said recess, its conical or flaring nature will direct the same out of said recess. It will also be seen that by unscrewing the nut G the wheel may be removed without displacing the spindle from the axletree, the end of the latter then being accessible for purposes requiring the same.

In order to lubricate the spindle, there are formed in the axletree the ducts L, which pass through said axletree, leading to the rollers J, and consequently to the adjacent portion of the spindle, thus nicely lubricating the contiguous parts, this being accomplished without removing the wheel.

In order to prevent displacement of the spindle, the same is formed with circumferential shoulders M, between which the rollers J are placed, and said rollers are mounted in and retained by the casings N, fitted in the interior of the axletree.

Owing to the recess K on the inner side of the hub, the oil or lubricant working to the front of the axletree may escape at said recess, and thus remove the same from soiling garments that may contact with the front or outer end of the hub.

In lieu of the rollers J, I may employ balls P for the same purpose, as in Fig. 3, said balls being fitted in the casing Q in the axletree, the casings N and Q retaining the respective rollers or balls in position, while permitting them to operate freely on the spindle, with the result hereinbefore stated.

Having thus described my invention, what I claim as new, and desire to secure by Letters Patent, is—

1. A wheel, a spindle or axle to which the same is secured to rotate as one, and a chambered axletree in which said spindle is mounted; the hub of said wheel having a recess in its inner side, the inner end portion of said axletree entering said recess, and the spokes of said hub circumscribing said inner end portion of the axletree.

2. A wheel, a spindle or axle to which the same is secured to rotate as one, a chambered axletree in which said spindle is mounted, and roller-bearings for said spindle between the same and said axletree; the hub of said wheel having a recess in its inner side, the inner end portion of said axletree entering said recess to the base thereof, the wall of said base freely abutting against the adjacent end of the axletree.

3. A wheel, a spindle or axle to which the same is secured to rotate as one, a chambered axletree in which said spindle is mounted and roller-bearings for said spindle between the same and said axletree, said spindle having circumferential shoulders within which the rollers of the bearings are contained; an angular portion on which the hub of said wheel is fitted, a threaded stem on said portion, and a nut on said stem, the hub of said wheel having a recess in its inner side, the base of said recess and the shoulder on the inner side of said squared portion freely abutting against the inner end of said axletree.

4. A wheel, a rotary spindle carrying the same, a hollow axletree in which said spindle is mounted, and roller-bearings for said spindle, said axletree having casings on its inner surface, the same receiving said bearings; the inner side of the hub of said wheel freely abutting against the inner end of said axletree and of the adjacent casing, and the spokes of said hub circumscribing the end portion of said tree.

5. A wheel, a spindle to which the same is secured, and an axletree in which said spindle is mounted, the hub of said wheel having a recess in its inner side, the same being adapted to have the outer end of said axletree project thereinto; and abut against the base of said recess, the latter flaring outwardly from said recess around the end portion of the axletree.

WILLIAM L. MARTIN.

Witnesses:
JOHN A. WIEDERSHEIM,
WM. CANER WIEDERSHEIM.